US012027080B1

(12) United States Patent
Jeon et al.

(10) Patent No.: US 12,027,080 B1
(45) Date of Patent: Jul. 2, 2024

(54) DISPLAY DEVICE, DISPLAY PANEL, AND SUBPIXEL CIRCUIT

(71) Applicant: LG Display Co., Ltd., Seoul (KR)

(72) Inventors: Sujin Jeon, Seoul (KR); Minji Han, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/239,569

(22) Filed: Aug. 29, 2023

(30) Foreign Application Priority Data

Dec. 19, 2022 (KR) ........................ 10-2022-0178514

(51) Int. Cl.
*G09G 3/3266* (2016.01)
*G09G 3/32* (2016.01)
*G09G 3/3275* (2016.01)

(52) U.S. Cl.
CPC ............. *G09G 3/3266* (2013.01); *G09G 3/32* (2013.01); *G09G 3/3275* (2013.01); *G09G 2310/0267* (2013.01); *G09G 2310/0275* (2013.01); *G09G 2310/08* (2013.01); *G09G 2320/0233* (2013.01); *G09G 2320/0247* (2013.01)

(58) Field of Classification Search
None
See application file for complete search history.

(56) References Cited

U.S. PATENT DOCUMENTS

2023/0067920 A1* 3/2023 Kim ..................... G09G 3/3291
2023/0103495 A1* 4/2023 Kim ..................... G09G 3/3233 345/76
2023/0402005 A1* 12/2023 Liu ...................... G09G 3/3233

* cited by examiner

*Primary Examiner* — Christopher J Kohlman
(74) *Attorney, Agent, or Firm* — Birch, Stewart, Kolasch & Birch, LLP

(57) ABSTRACT

A display device can include a display panel including a light emitting element, a driving transistor for providing a driving current, and a plurality of switching transistors for controlling an operation of the driving transistor; a gate driving circuit configured to supply signals to the display panel; a data driving circuit configured to supply a plurality of data voltages to the display panel; and a timing controller. Also, the plurality of switching transistors can include a first switching transistor having a dual gate structure and configured to connect a gate node of the driving transistor with a drain node of the driving transistor in response to a first scan signal, and a stabilization transistor configured to connect the gate node of the driving transistor with a common node of the first switching transistor in response to a stabilization scan signal.

20 Claims, 7 Drawing Sheets

DISPLAY DEVICE, DISPLAY PANEL, AND SUBPIXEL CIRCUIT

CROSS-REFERENCE TO RELATED APPLICATION

This application claims priority under 35 U.S.C. § 119(a) to Korean Patent Application No. 10-2022-0178514, filed in the Republic of Korea on Dec. 19, 2022, which is hereby incorporated by reference for all purposes as if fully set forth herein.

BACKGROUND

Field

Embodiments of the disclosure relate to a display device, a display panel, and a subpixel circuit, and more particularly, to a display device, a display panel, and a subpixel circuit capable of enhancing image quality by reducing a luminance deviation caused by a leakage current. Further, the display device according to the embodiments of the disclosure are provided to better stabilize a gate node of a driving transistor and prevent leakage current.

Description of Related Art

With the development of the information society, various needs for display devices that display images are increasing, and various types of display devices, such as liquid crystal displays LCDs, organic light emitting displays OLEDs, etc. are being utilized.

Among these display devices, the organic light emitting display device uses self-emissive organic light emitting diodes, providing advantages, such as a fast response and better contrast ratio, luminous efficiency, luminance, and viewing angle.

The organic light emitting display device can include organic light emitting diodes respectively arranged in a plurality of subpixels disposed on a display panel and cause the organic light emitting diodes to emit light by controlling the current flowing to the organic light emitting diodes, thereby displaying images while controlling the brightness of each subpixel.

Such a display device can have subpixel circuits disposed on the display panel to drive the light emitting elements. For example, the subpixel circuit includes a driving transistor for controlling a driving current flowing through the light emitting element, and at least one switching transistor for controlling the operation of the driving transistor according to a scan signal. The switching transistor of the subpixel circuit can be controlled by the gate signal output from the gate driving circuit.

In this situation, some nodes of the driving transistor can operate as floating nodes according to the operation of the switching transistor. In this situation, the potential can vary due to a leakage current, causing a luminance deviation.

SUMMARY OF THE DISCLOSURE

Accordingly, the inventors of the disclosure have invented a display device, a display panel, and a subpixel circuit capable of reducing luminance deviation caused by leakage current, thereby enhancing image quality.

Embodiments of the disclosure can provide a display device, a display panel, and a subpixel circuit capable of reducing luminance deviation caused by leakage current and enhancing image quality by using a transistor capable of stabilizing the gate node potential of the driving transistor.

Embodiments of the disclosure provide a display device, a display panel, and a subpixel circuit capable of reducing luminance deviation and enhancing image quality by maintaining the gate node of the driving transistor at a stable potential before an emission period using a stabilization transistor.

Embodiments of the disclosure can provide a display device comprising a display panel including a plurality of subpixel circuits having a light emitting element, a driving transistor for providing a driving current to the light emitting element using a driving voltage, and a plurality of switching transistors for controlling an operation of the driving transistor, a gate driving circuit supplying a light emission signal and a plurality of scan signals to the display panel, a data driving circuit supplying a data voltage to the display panel, and a timing controller controlling the gate driving circuit and the data driving circuit, in which the plurality of switching transistors include a first switching transistor controlled by a first scan signal and having a dual gate structure which connects a gate node and a drain node of the driving transistor and a stabilization transistor controlled by a stabilization scan signal and connecting the gate node of the driving transistor and a common node of the first switching transistor.

Embodiments of the disclosure can provide a display panel comprising a plurality of subpixels having a light emitting element, a driving transistor for providing a driving current to the light emitting element using a driving voltage, and a plurality of switching transistors for controlling an operation of the driving transistor, a plurality of data lines supplying a data voltage to the plurality of subpixels, and a plurality of gate lines supplying a light emission signal and a plurality of scan signals to the plurality of subpixels, the plurality of switching transistors include a first switching transistor controlled by a first scan signal and having a dual gate structure which connects a gate node and a drain node of the driving transistor and a stabilization transistor controlled by a stabilization scan signal and connecting the gate node of the driving transistor and a common node of the first switching transistor.

Embodiments of the disclosure can provide a subpixel circuit comprising a light emitting element, a driving transistor for providing a driving current to the light emitting element using a driving voltage, and a plurality of switching transistors for controlling an operation of the driving transistor, in which the plurality of switching transistors include a first switching transistor controlled by a first scan signal and having a dual gate structure which connects a gate node and a drain node of the driving transistor and a stabilization transistor controlled by a stabilization scan signal and connecting the gate node of the driving transistor and a common node of the first switching transistor.

According to embodiments of the disclosure, there can be provided a display device, a display panel, and a subpixel circuit capable of reducing or preventing luminance deviation caused by leakage current, thereby enhancing image quality.

According to embodiments of the disclosure, it is possible to reduce or prevent luminance deviation caused by leakage current and enhance image quality by using a transistor capable of stabilizing the gate node potential of the driving transistor.

According to embodiments of the disclosure, it is possible to reduce luminance deviation and enhance image quality by maintaining the gate node of the driving transistor at a stable potential before an emission period using a stabilization transistor.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
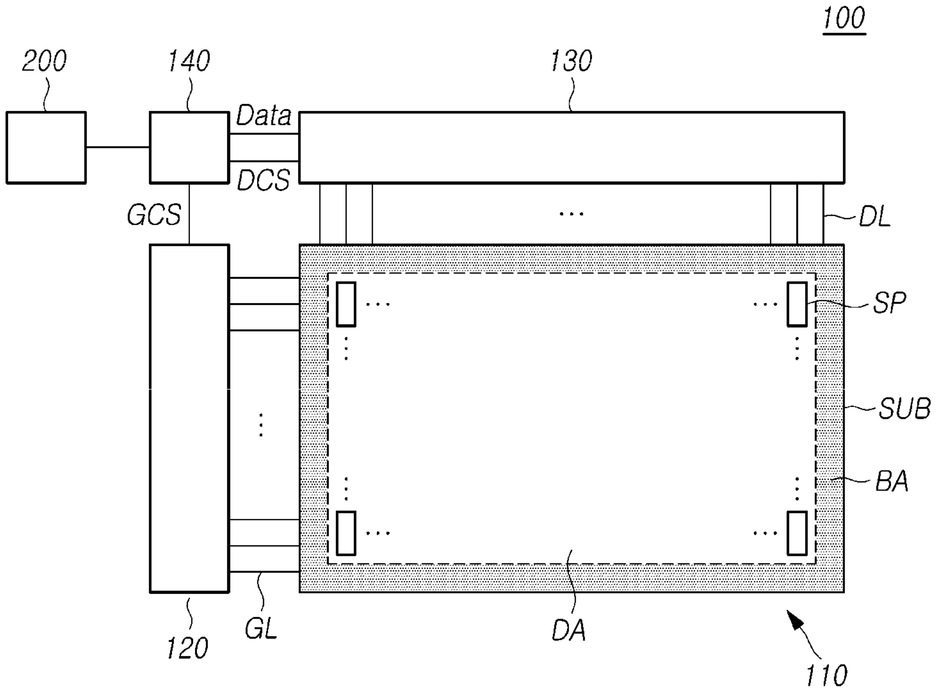
FIG. 1 is a view schematically illustrating a display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as “including,” “having,” “containing,” “constituting” “make up of,” and “formed of” used herein are generally intended to allow other components to be added unless the terms are used with the term “only.” As used herein, singular forms are intended to include plural forms unless the context clearly indicates otherwise.

Terms, such as “first,” “second,” “A,” “B,” “A,” or “B” can be used herein to describe elements of the disclosure. Each of these terms is not used to define essence, order, sequence, or number of elements etc., but is used merely to distinguish the corresponding element from other elements.

When it is mentioned that a first element “is connected or coupled to,” “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to,” “contact or overlap,” etc. each other via a fourth element. Here, the second element can be included in at least one of two or more elements that “are connected or coupled to,” “contact or overlap,” etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors e.g., process factors, internal or external impact, noise, etc.) even when a relevant description is not specified. Further, the term “can” fully encompasses all the meanings of the term “can.”

The features of various embodiments of the present disclosure can be partially or entirely coupled to or combined with each other and can be interlocked and operated in technically various ways, and the embodiments can be carried out independently of or in association with each other.

Hereinafter, various embodiments of the disclosure will be described in detail with reference to the accompanying drawings.

FIG. 1 is a view schematically illustrating a display device according to embodiments of the disclosure.

Referring to FIG. 1, a display device 100 according to embodiments of the disclosure can include a display panel 110 and a driving circuit for driving the display panel 110.

The display panel 110 can include a display area DA in which images are displayed and a bezel area BA in which no image is displayed. The bezel area BA can also be referred to as a non-display area.

The display panel 110 can include a plurality of subpixels SP for displaying images. For example, a plurality of subpixels SP can be disposed in the display area DA. In some situations, at least one subpixel SP can be disposed in the bezel area BA. At least one subpixel SP disposed in the bezel area BA can be referred to as a dummy subpixel.

The display panel 110 can include a plurality of signal lines for driving a plurality of subpixels SP. For example, the plurality of signal lines can include a plurality of data lines DL and a plurality of gate lines GL. The signal lines can further include other signal lines than the plurality of data lines DL and the plurality of gate lines GL according to the structure of the subpixel SP. For example, the other signal lines can include driving voltage lines and reference voltage lines.

The plurality of data lines DL and the plurality of gate lines GL can cross each other. Each of the plurality of data lines DL can be disposed while extending in a first direction. Each of the plurality of gate lines GL can be disposed while extending in a second direction. Here, the first direction can be a column direction and the second direction can be a row direction. In the disclosure, the column direction and the row direction are relative. For example, the column direction can be a vertical direction and the row direction can be a horizontal direction. As another example, the column direction can be a horizontal direction and the row direction can be a vertical direction.

The driving circuit can include a data driving circuit 130 for driving a plurality of data lines DL and a gate driving circuit 120 for driving a plurality of gate lines GL. The driving circuit can further include a timing controller 140 for controlling the data driving circuit 130 and the gate driving circuit 120.

The data driving circuit 130 is a circuit for driving the plurality of data lines DL, and can output data signals (also referred to as data voltages) corresponding to image signals to the plurality of data lines DL. The gate driving circuit 120 is a circuit for driving the plurality of gate lines GL and can generate gate signals, and output the gate signals to the plurality of gate lines GL. The gate signal can include one or more scan signals and light emission signals.

The timing controller 140 can start a scan according to the timing implemented in each frame and can control an operation of the data driving circuit 130 at an appropriate time according to the scan. The timing controller 140 can convert input image data input from the outside to suit the data signal format used by the data driving circuit 130 and supply the converted image data DATA to the data driving circuit 130.

The timing controller 140 can receive display driving control signals, along with input image data, from an external host system 200. For example, the display driving control signals can include a vertical synchronizing signal, a horizontal synchronizing signal, an input data enable signal, and a clock signal.

The timing controller 140 can generate the data driving control signal DCS and the gate driving control signal GCS based on display driving control signals input from the host system 200. The timing controller 140 can control the driving operation and driving timing of the data driving circuit 130 by supplying the data driving control signal DCS to the data driving circuit 130. The timing controller 140 can control the driving operation and driving timing of the gate driving circuit 120 by supplying the gate driving control signal GCS to the gate driving circuit 120.

The data driving circuit 130 can include one or more source driving integrated circuits SDIC. Each source driving integrated circuit can include a shift register, a latch circuit, a digital to analog converter (DAC), an output buffer, and the like. In some situations, each source driving integrated circuit can further include an analog to digital converter (ADC).

For example, each source driving integrated circuit can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

The gate driving circuit 120 can output a gate signal of a turn-on level voltage or a gate signal of a turn-off level voltage according to the control of the timing controller 140. The gate driving circuit 120 can sequentially drive the plurality of gate lines GL by sequentially supplying gate signals of the turn-on level voltage to the plurality of gate lines GL.

The gate driving circuit 120 can include one or more gate driving integrated circuits GDIC.

The gate driving circuit 120 can be connected with the display panel 110 by the TAB method or connected to a bonding pad of the display panel 110 by a COG or COP method or can be connected with the display panel 110 according to a COF method. Alternatively, the gate driving circuit 120 can be formed, in a gate in panel (GIP) type, in the bezel area BA of the display panel 110. The gate driving circuit 120 can be disposed on the substrate or can be connected to the substrate. In other words, the gate driving circuit 120 that is of a GIP type can be disposed in the bezel area BA of the substrate. The gate driving circuit 120 that is of a chip-on-glass (COG) type or chip-on-film (COF) type can be connected to the substrate.

Meanwhile, at least one of the data driving circuit 130 and the gate driving circuit 120 can be disposed in the display area DA. For example, at least one of the data driving circuit 130 and the gate driving circuit 120 can be disposed so that it does not overlap with the subpixels SP or so that it overlaps with all or some of the subpixels SP.

The data driving circuit 130 can be connected to one side (e.g., an upper or lower side) of the display panel 110. Depending on the driving scheme or the panel design scheme, the data driving circuit 130 can be connected with both sides (e.g., upper and lower sides) of the self-emission display panel 110, or two or more of the four sides of the self-emission display panel 110.

The gate driving circuit 120 can be connected with one side (e.g., a left or right side) of the display panel 110. Depending on the driving scheme or the panel design scheme, the gate driving circuit 120 can be connected with both sides (e.g., left and right sides) of the display panel 110, or two or more of the four sides of the display panel 110.

The timing controller 140 can be implemented as a separate component from the data driving circuit 130, or the timing controller 140 and the data driving circuit 130 can be integrated into an integrated circuit (IC). The timing controller 140 can be a controller used in display technology or a control device that can perform other control functions as well as the functions of the timing controller, or a circuit in the control device. The timing controller 140 can be implemented as various circuits or electronic components, such as an integrated circuit (IC), a field programmable gate array (FPGA), an application specific integrated circuit (ASIC), or a processor.

The timing controller 140 can be mounted on a printed circuit board or a flexible printed circuit and can be electrically connected with the data driving circuit 130 and the gate driving circuit 120 through the printed circuit board or the flexible printed circuit. The timing controller 140 can transmit/receive signals to/from the data driving circuit 130 according to one or more predetermined interfaces. The interface can include, e.g., a low voltage differential signaling (LVDS) interface, an EPI interface, and a serial peripheral interface (SP).

The display device 100 according to embodiments of the disclosure can be a self-emissive display device in which the display panel 110 emits light by itself (e.g., no backlight unit is needed). When the display device 100 according to the embodiments of the disclosure is a self-emissive display device, each of the plurality of subpixels SP can include a light emitting element. For example, the display device 100 according to embodiments of the disclosure can be an organic light emitting diode display in which the light emitting element is implemented as an organic light emitting diode (OLED). As another example, the display device 100 according to embodiments of the disclosure can be an inorganic light emitting display device in which the light emitting element is implemented as an inorganic material-based light emitting diode. As another example, the display device 100 according to embodiments of the disclosure can be a quantum dot display device in which the light emitting element is implemented as a quantum dot which is self-emission semiconductor crystal.

Figure 2:
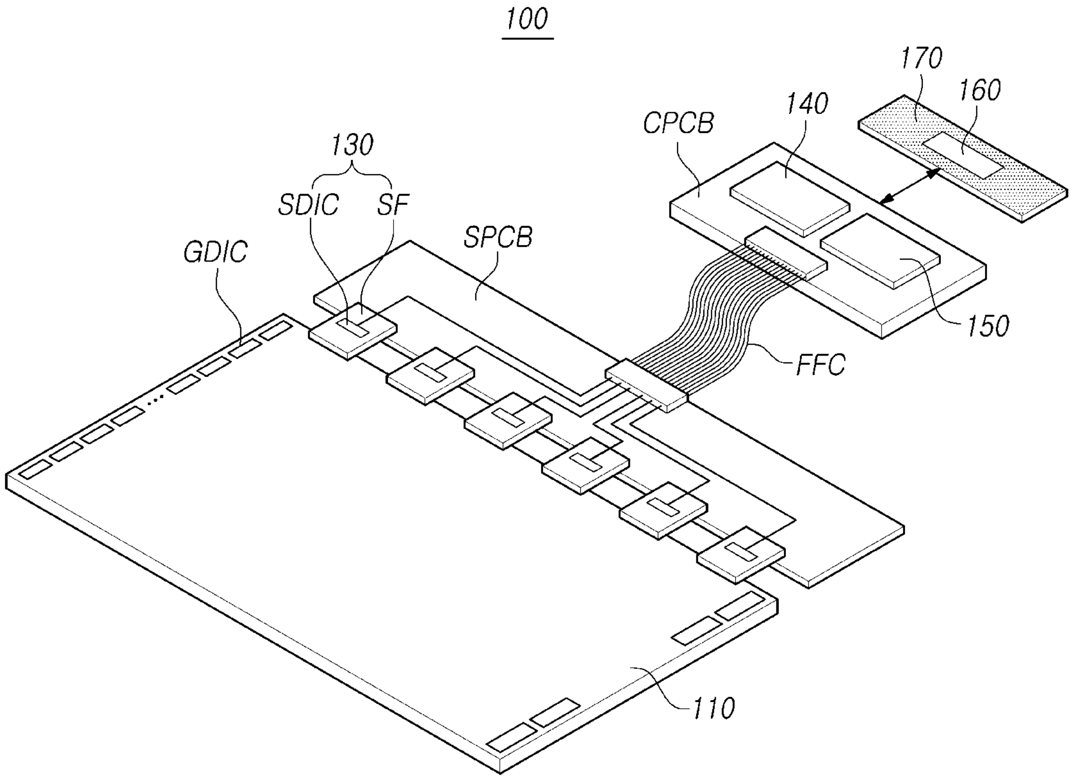
FIG. 2 is a system example view illustrating a display device according to embodiments of the disclosure.

FIG. 2 is a system example view illustrating a display device according to embodiments of the disclosure.

FIG. 2 illustrates an example in which in the display device 100 according to embodiments of the disclosure, the data driving circuit 130 is implemented by a chip on film (COF) type among various types (e.g., TAB, COG, and COF), and the gate driving circuit 120 is implemented by a gate in panel (GIP) type among various types (e.g., TAB, COG, COF, and GIP).

When the gate driving circuit 120 is implemented in the GIP type, the plurality of gate driving integrated circuits GDIC included in the gate driving circuit 120 can be directly formed in the bezel area of the display panel 110. In this situation, the gate driving integrated circuits GDIC can receive various signals (e.g., a clock, a gate high signal, a gate low signal, etc.) necessary for generating scan signals through gate driving-related signal lines disposed in the bezel area.

Likewise, one or more source driving integrated circuits SDIC included in the data driving circuit 130 can be mounted on the source film SF, and one side of the source film SF can be electrically connected with the display panel 110. Lines for electrically connecting the source driver integrated circuit SDIC and the display panel 110 can be disposed on the source film SF.

The display device 100 can include at least one source printed circuit board SPCB for circuit connection between a plurality of source driving integrated circuits SDIC and other devices, and a control printed circuit board CPCB for mounting control components and various electric devices.

The other side of the source film SF where the source driving integrated circuit SDIC is mounted can be connected to at least one source printed circuit board SPCB. In other words, one side of the source film SF where the source driving integrated circuit SDIC is mounted can be electrically connected with the display panel 110, and the other side of the source film SF can be electrically connected with the source printed circuit board SPCB.

The timing controller 140 and the power management circuit 150 can be mounted on the control printed circuit board CPCB. The timing controller 140 can control the operation of the data driving circuit 130 and the gate driving circuit 120. The power management circuit 150 can supply driving voltage or current to the display panel 110, the data driving circuit 130, and the gate driving circuit 120 and control the supplied voltage or current.

At least one source printed circuit board SPCB and control printed circuit board CPCB can be circuit-connected through at least one connection member. The connection member can include, e.g., a flexible printed circuit FPC or a flexible flat cable FFC. The at least one source printed circuit board SPCB and control printed circuit board CPCB can be integrated into a single printed circuit board.

The display device 100 can further include a set board 170 electrically connected to the control printed circuit board CPCB. In this situation, the set board 170 can also be referred to as a power board. A main power management circuit 160 for managing the overall power of the display device 100 can be present on the set board 170. The main power management circuit 160 can interwork with the power management circuit 150.

In the display device 100, the driving voltage can be generated in the set board 170 and transferred to the power management circuit 150 in the control printed circuit board CPCB. The power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 can include a light emitting element and a circuit element, e.g., a driving transistor, for driving the organic light emitting diode.

The type and number of circuit elements constituting each subpixel SP can be varied depending on the types of functions to be provided and design schemes.

The display device 100 of the disclosure can reduce a luminance deviation caused by leakage current and enhance image quality by stably maintaining the gate node of the driving transistor constituting the subpixel SP.

Figure 3:
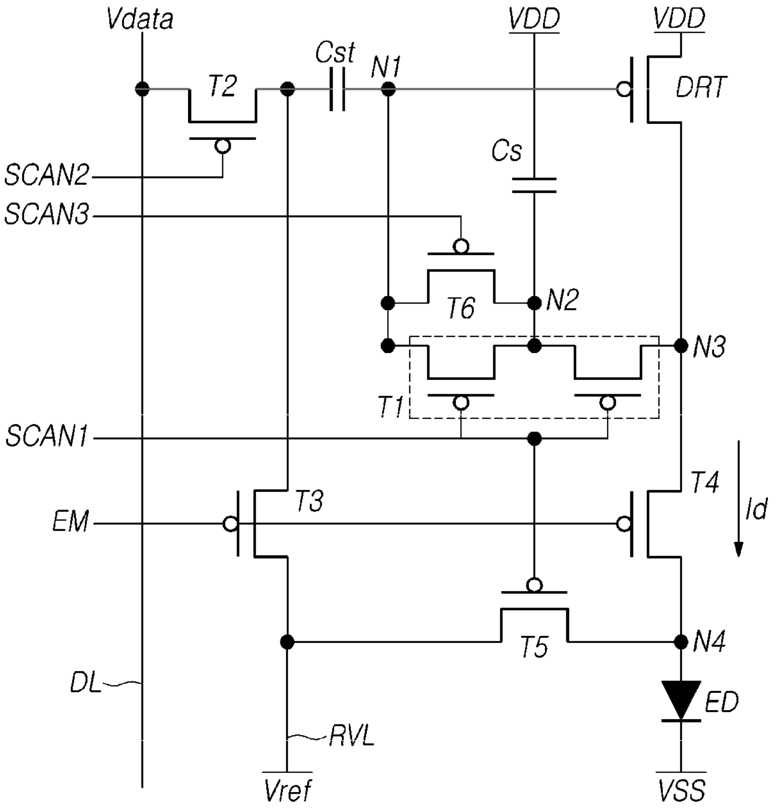
FIG. 3 is a view illustrating an example of a subpixel circuit of a display device according to embodiments of the disclosure.
Figure 4:
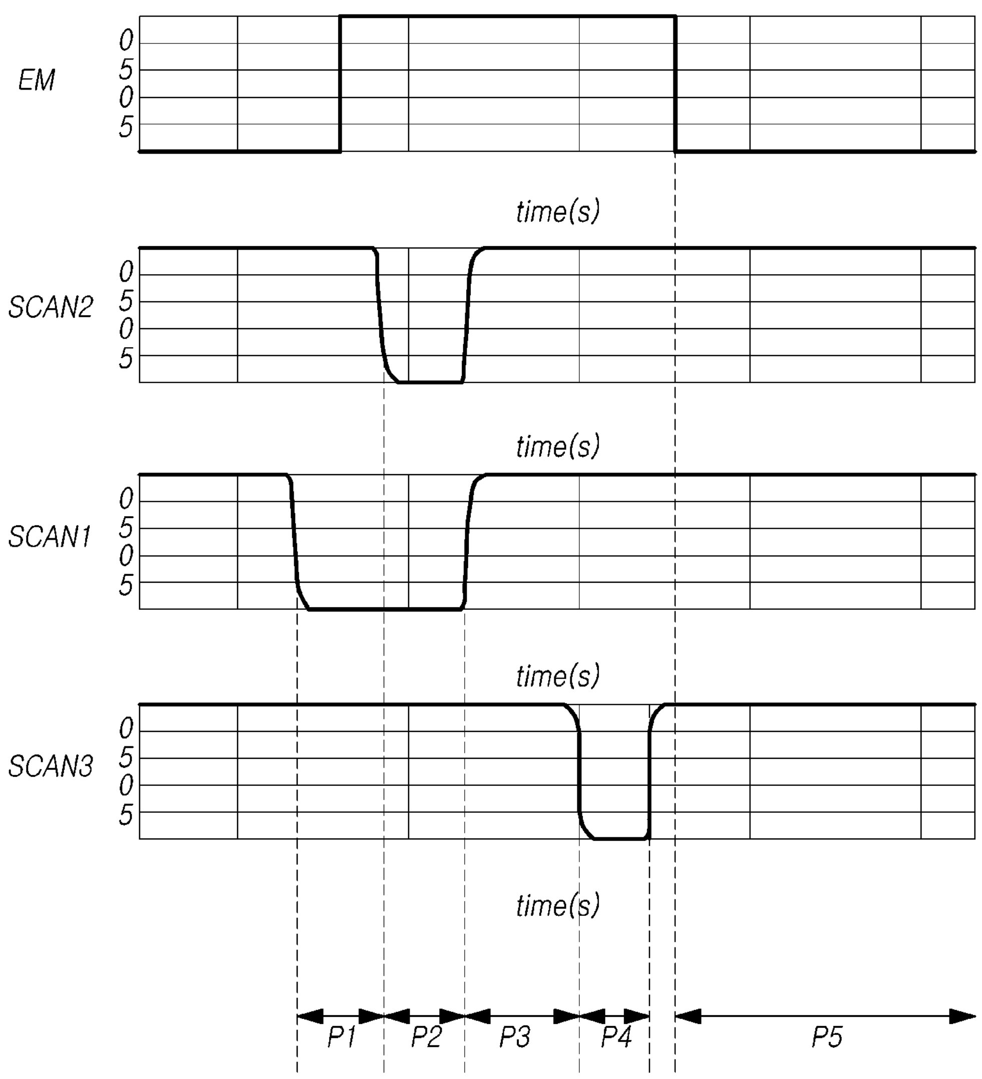
FIG. 4 is a signal waveform diagram illustrating an operation of a subpixel circuit in a display device according to embodiments of the disclosure.

FIG. 3 is a view illustrating an example subpixel circuit in a display device according to embodiments of the disclosure. FIG. 4 is a signal waveform diagram illustrating an operation of a subpixel circuit.

Referring to FIGS. 3 and 4, the subpixel circuit of the display device 100 according to embodiments of the disclosure can include a plurality of switching transistors T1 to T5, a driving transistor DRT, a storage capacitor Cst, and a light emitting element ED.

The light emitting element ED can be, e.g., a self-emissive light emitting element, such as an organic light emitting diode OLED.

Here, an example in which the subpixel circuit is implemented based on six transistors T1 to T5 and DRT is described, but the technical spirit of the disclosure is not limited thereto. For example, each subpixel circuit can be connected to three gate lines (e.g., for signals SCAN1, SCAN2 and SCAN3), an emission line (e.g., for light emission signal EM), a reference voltage line RVL (e.g., for Vref), a data line DL, driving voltage VDD and base voltage VSS.

The subpixel circuit according to embodiments can operate in the order of an initialization period P1, a sampling period P2, a sustain period P3, a stabilization period P4, and an emission period P5.

The initialization period P1 is a period for initializing the gate node of the driving transistor DRT. The sampling period P2 is a period for initializing the light emitting element ED while sampling the threshold voltage Vth of the driving transistor DRT. The sustain period P3 is a period for maintaining the data voltage Vdata applied through the data line DL at a specific node. The stabilization period P4 is a period for maintaining the gate node of the driving transistor DRT at a stable potential (e.g., a stable voltage level). The emission period P5 is a period for allowing the light emitting element ED to emit light through the driving current generated based on the data voltage Vdata.

The first switching transistor T1 is turned on or off according to the first scan signal SCAN1, and electrically connects the gate node N1 of the driving transistor DRT corresponding to the other side of the storage capacitor Cst and the drain node N3 of the driving transistor DRT in the turned-on state. For example, the first switching transistor T1 can selectively connect the gate node N1 of the driving transistor DRT to the drain node N3 of the driving transistor DRT.

The first switching transistor T1 is turned on during the initialization period P1 to initialize the gate node N1 of the driving transistor DRT, and is turned on during the sampling period P2 to form a current path between the gate node N1 of the driving transistor DRT and the drain node N3 of the driving transistor DRT. In this situation, the first switching transistor T1 can have a dual gate structure to suppress a high temperature leakage current. For example, the switching transistor T1 can include two separate transistors connected in series with their gates tied together.

In this situation, the common node N2 of the first switching transistor T1 having the dual gate structure can be in a floating state according to the operating state of the first switching transistor T1. When the common node N2 of the first switching transistor T1 is in the floating state, the operation of the first switching transistor T1 may become unstable. Therefore, in order to stabilize the common node N2 of the first switching transistor T1, the common node N2 of the first switching transistor T1 and the driving voltage VDD can be connected to the stabilization capacitor Cs.

The second switching transistor T2 is turned on or off according to the second scan signal SCAN2, and supplies the data voltage Vdata to one side of the storage capacitor Cst in the turned-on state. An output node (e.g., a drain node) of the second switching transistor T2 can be connected to an output node (e.g., the drain node) of the third switching transistor T3. The second switching transistor T2 is turned on during the sampling period P2 to form a current path between the data line DL and the storage capacitor Cst.

The third switching transistor T3 is turned on or off according to the light emission signal EM, and supplies the reference voltage Vref supplied from the reference voltage line RVL to the output node of the second switching transistor T2 in the turned-on state. In other words, the third switching transistor T3 is turned on during the initialization period P1 and the emission period P5 to supply the reference voltage Vref to the output node of the second switching transistor T2.

The fourth switching transistor T4 is turned on or off according to the light emission signal EM, and connects the drain node N3 of the driving transistor DRT and the anode electrode N4 of the light emitting element ED to each other in the turned-on state. In this situation, the source node of the fourth switching transistor T4 can be connected to the drain node N3 of the driving transistor DRT. For example, the gates of the third switching transistor T3 and the fourth switching transistor T4 can be tied together.

The fourth switching transistor T4 is turned on during the initialization period P1 and the emission period P5 to form a current path between the drain node N3 of the driving transistor DRT and the anode electrode N4 of the light emitting element ED.

The fifth switching transistor T5 is turned on or off according to the second scan signal SCAN2, and supplies the reference voltage Vref to the anode node N4 of the light emitting element ED in the turned-on state. In other words, the fifth switching transistor T5 is turned on during the initialization period P1 and the sampling period P2 to supply the reference voltage Vref to the anode electrode N4 of the light emitting element ED. For example, the dual gates of the first switching transistor T1 and the fifth switching transistor T5 can all be tied together.

The driving transistor DRT adjusts the degree of light emission of the light emitting element ED by applying the driving voltage VDD to the source node and controlling the driving current supplied to the light emitting element ED according to the voltage of the gate node N1.

The storage capacitor Cst is connected between the output node of the second switching transistor T2 and the gate node N1 of the driving transistor DRT. The anode electrode N4 of the light emitting element ED is connected to the drain nodes of the fourth switching transistor T4 and the fifth switching transistor T5, and the base voltage VSS is applied to the cathode electrode.

The stabilization capacitor Cs connects the common node N2 of the first switching transistor T1 to the driving voltage VDD. However, the stabilization capacitor Cs may be omitted depending on the subpixel circuit.

The common node N2 of the first switching transistor T1 can be in the floating state according to the operation of the first switching transistor T1. In this situation, the potential can be determined according to the driving transistor DRT and the first switching transistor T1.

When the common node N2 of the first switching transistor T1 is in the floating state, a leakage current may flow from the drain node of the driving transistor DRT or the stabilization capacitor Cs to the gate node N1 of the driving transistor DRT through the first switching transistor T1. The leakage current can cause image artifacts due to luminance deviation by changing the potential of the gate node N1 of the driving transistor DRT.

In order to reduce the luminance deviation due to the leakage current, a sixth switching transistor T6 can be disposed in the pixel circuit for maintaining the gate node N1 of the driving transistor DRT and the common node N2 of the first switching transistor T1 at the same potential.

The sixth switching transistor T6 is turned on or off according to the third scan signal SCAN3, and connects the common node N2 of the first switching transistor T1 and the gate node N1 of the driving transistor DRT to each other in the turned-on state.

The sixth switching transistor T6 is turned on during the stabilization period P4 before the emission period P5 to form a current path between the gate node N1 of the driving transistor DRT and the common node N2 of the first switching transistor T1.

Accordingly, during the stabilization period P4, the gate node N1 of the driving transistor DRT maintains the same potential as the common node N2 of the first switching transistor T1.

Meanwhile, the P-type transistor is relatively reliable compared to the N-type transistor, and thus it can stably supply current. Here, an example in which the transistors T1-T5 and DRT constituting the subpixel circuit are configured as P-type transistors is illustrated, but at least some transistors can be configured as N-type transistors.

During the initialization period P1, the second scan signal SCAN2 and the third scan signal SCAN3 are output at a high level corresponding to the gate-off voltage, and the first scan signal SCAN1 and the light emission signal EM are output at a low level corresponding to the gate-on voltage.

Accordingly, the third and fourth switching transistors T3 and T4 are turned on by the light emission signal EM, and the first and fifth switching transistors T1 and T5 are turned on by the first scan signal SCAN1 (e.g., since the gates of T1 and T5 are all tied together). Accordingly, the reference voltage Vref is supplied to the gate node N1 of the driving transistor DRT through the third switching transistor T3 and the storage capacitor Cst, and the gate node N1 of the driving transistor DRT is initialized, and the reference voltage Vref is supplied to the anode electrode N4 of the light emitting element ED through the fifth switching transistor T5 and is initialized to the reference voltage Vref. Further, the reference voltage Vref is supplied to the drain node N3 of the driving transistor DRT through the turned-on fourth switching transistor T4 and is initialized to the reference voltage Vref. Further, the reference voltage Vref is supplied to the common node N2 of the first switching transistor T1 by the turned-on first switching transistor T1 and the common node N2 of the first switching transistor T1 is initialized to the reference voltage Vref.

During the sampling period P2, the first scan signal SCAN1 and the second scan signal SCAN2 are output at a low level corresponding to the gate-on voltage, and the light emission signal EM and the third scan signal SCAN3 are output at a high level corresponding to the gate-off voltage.

During the sampling period P2, the first switching transistor T1, the second switching transistor T2, and the fifth switching transistor T5 are turned on in response to the first scan signal SCAN1 and the second scan signal SCAN2, and the third switching transistor T3 and the fourth switching transistor T4 maintain the turned-off state in response to the light emission signal EM. Accordingly, the data voltage Vdata is supplied to the storage capacitor Cst through the first switching transistor T1. The driving transistor DRT samples the difference VDD-Vth between the driving voltage VDD and the threshold voltage Vth of the driving transistor DRT by the turned-on second switching transistor T2 and supplies the same to the gate node N1 of the driving transistor DRT.

During the sustain period P3, the first scan signal SCAN1, the second scan signal SCAN2, the third scan signal SCAN3, and the light emission signal EM are all output at a high level that is a gate-off voltage.

The sustain period P3 is a period in which the sampling period P2 and the emission period P5 have a predetermined time difference so that the sampling period P2 and the emission period P5 do not overlap each other.

During the stabilization period P4, the first scan signal SCAN1, the second scan signal SCAN2, and the light emission signal EM are output at a high level which is a gate-off voltage, and the third scan signal SCAN3 is output at a low level which is a gate-on voltage.

During the stabilization period P4, in a state in which the first switching transistor T1 is turned off by the first scan signal SCAN1, the sixth switching transistor T6 is turned on by the third scan signal SCAN3 of the low level corresponding to the gate-on voltage. Accordingly, the gate node N1 of the driving transistor DRT maintains the same potential as the common node N2 of the first switching transistor T1. As a result, even if the common node N2 of the first switching transistor T1 is in the floating state and a leakage current flows, the gate node N1 of the driving transistor DRT can be stably maintained to reduce luminance deviation and enhance image quality.

During the emission period P5, the first scan signal SCAN1, the second scan signal SCAN2, and the third scan signal SCAN3 are all output at a high level which is the gate-off voltage, and the light emission signal EM is output at a low level which is the gate-on voltage.

Accordingly, the third switching transistor T3 and the fourth switching transistor T4 are turned on. As a result, the reference voltage Vref is applied to one side of the storage capacitor Cst through the third switching transistor T3, and the difference Vref-Vdata between the reference voltage Vref and the data voltage Vdata is reflected in the gate node N1 of the driving transistor DRT. Accordingly, the driving current Id corresponding to the gate-source voltage of the driving transistor DRT flows through the light emitting element ED during the emission period P4.

As such, a subpixel circuit constituted of seven transistors DRT and T1-T6 and two capacitors Cst and Cs can be referred to as a 7T2C structure.

As described above, the display device 100 of the disclosure can turn on the sixth switching transistor T6 before the emission period P5 to maintain the gate node N1 of the driving transistor DRT at a stable potential, thereby reducing luminance deviation due to leakage current and enhancing image quality. Accordingly, the sixth switching transistor T6 for maintaining the gate node N1 of the driving transistor DRT at a stable potential can be referred to as a stabilization transistor, and the third scan signal SCAN3 can be referred to as a stabilization scan signal.

Figure 5:
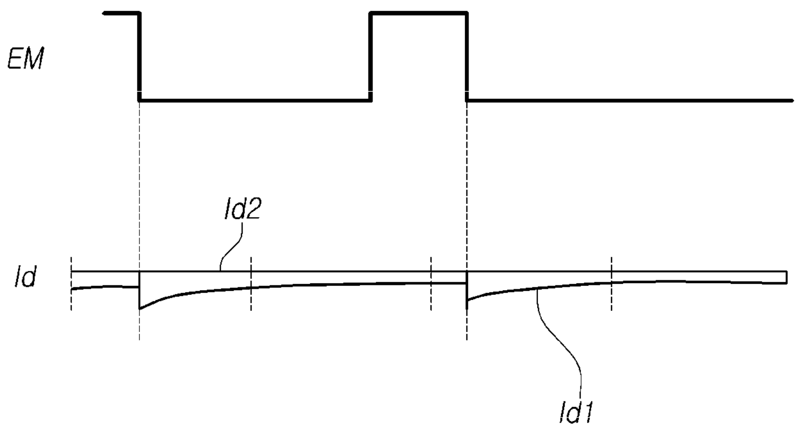
FIG. 5 is a signal waveform diagram experimentally illustrating variations in driving current when a subpixel circuit includes or lacks a stabilization transistor in a display device according to embodiments of the disclosure.

FIG. 5 is a signal waveform diagram experimentally illustrating variations in driving current when a subpixel circuit includes or lacks a stabilization transistor (e.g., T6) in a display device according to embodiments of the disclosure.

Referring to FIG. 5, the display device 100 according to embodiments of the disclosure can connect the gate node N1 and the drain node N3 of the driving transistor DRT constituting the subpixel circuit to the first switching transistor T1. In this situation, the first switching transistor T1 can have a dual gate structure, and the common node N2 of the first switching transistor T1 can be in a floating state according to the operation of the first switching transistor T1.

In this situation, when there is no sixth switching transistor T6 for maintaining the gate node N1 of the driving transistor DRT and the common node N2 of the first switching transistor T1 at the same potential, a leakage current can flow to the gate node N1 of the driving transistor DRT through the first switching transistor T1 in an edge period in which the light emission signal EM is shifted.

The leakage current can cause a variation in the potential of the gate node N1 of the driving transistor DRT and resultantly a variation in the driving current Id1 flowing through the light emitting element ED, resulting in image artifacts due to luminance deviation.

On the other hand, when the sixth switching transistor T6 is added to the subpixel circuit to maintain the gate node N1 of the driving transistor DRT and the common node N2 of the first switching transistor T1 at the same potential, the leakage current can be reduced by turning on the sixth switching transistor T6 before the emission period P5 to maintain the gate node N1 of the driving transistor DRT at the same potential as the common node N2 of the first switching transistor T1.

As a result, when the sixth switching transistor T6 is added to the subpixel circuit, the variation in the potential of the gate node N1 of the driving transistor DRT is reduced, and the driving current Id2 flowing through the light emitting element ED remains stable, thereby reducing the luminance deviation and enhancing the image quality.

Meanwhile, the subpixel circuit according to embodiments of the disclosure can be applied to other structures.

Figure 6:
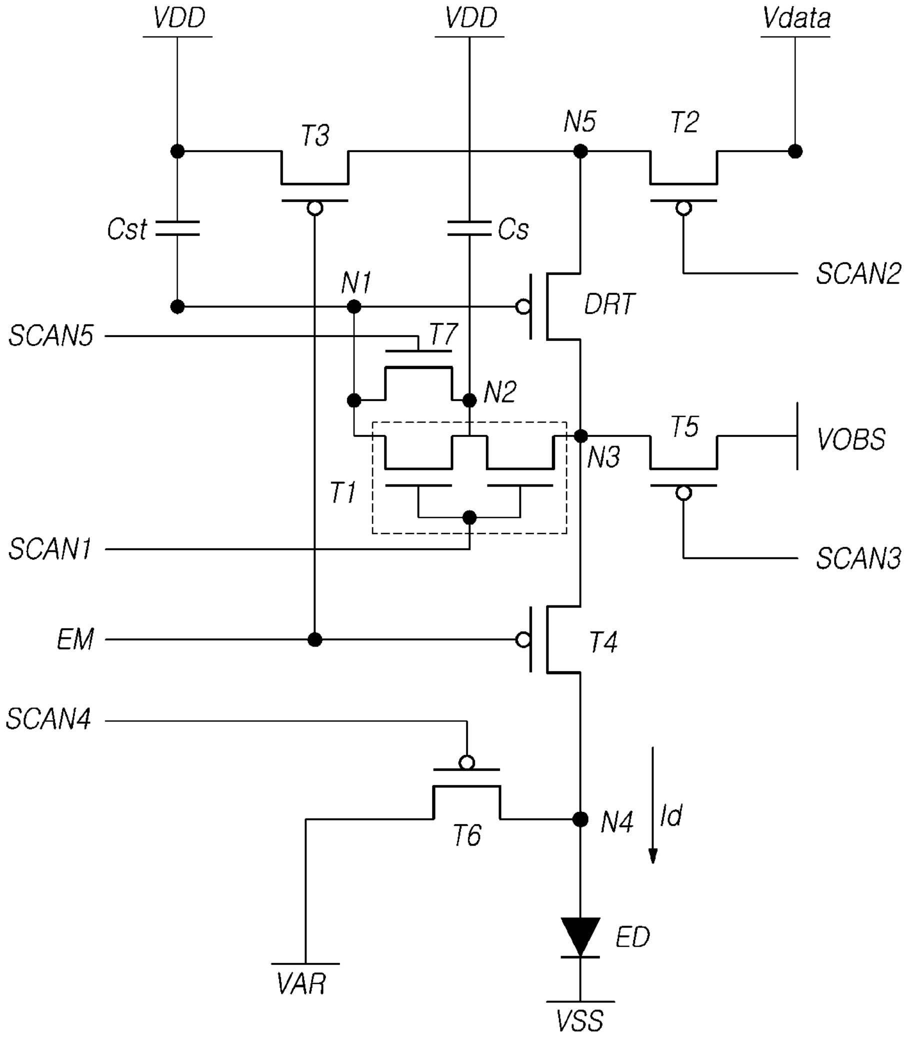
FIG. 6 is a view illustrating an example structure of another subpixel circuit in a display device according to embodiments of the disclosure.

FIG. 6 is a view illustrating an example structure of another subpixel circuit in a display device according to embodiments of the disclosure.

Referring to FIG. 6, a subpixel circuit of a display device 100 according to embodiments of the disclosure can include first to seventh switching transistors T1 to T7, a driving transistor DRT, a storage capacitor Cst, a stabilization capacitor Cs, and a light emitting element ED.

The light emitting element ED can be, e.g., a self-emissive light emitting element, such as an organic light emitting diode OLED.

In the subpixel circuit according to embodiments of the disclosure, the second to sixth switching transistors T2-T6 and the driving transistor DRT can be P-type transistors. Also, the first switching transistor T1 and the seventh switching transistor T7 can be N-type transistors.

The P-type transistor is relatively more reliable than the N-type transistor. In the situation of the P-type transistor, since the drain node is electrically connected to the high potential driving voltage VDD, the current flowing through the light emitting device ED is not shaken by the storage capacitor Cst. Therefore, it is easy to supply current stably.

For example, the fourth switching transistor T4 and the sixth switching transistor T6 can be connected to the anode electrode of the light emitting device ED. In this situation, when the switching transistors T4 and T6 connected to the light emitting diode ED operate in the saturation area, a constant current can flow regardless of a change in the current and threshold voltage of the light emitting diode ED, and thus reliability is relatively high.

In the structure of such a subpixel circuit, the N-type transistors T1 and T7 can be formed of oxide transistors (e.g., transistors having channels formed from semiconductor oxides such as indium, gallium, zinc oxide, or IGZO) formed using semiconductor oxides, and the other P-type transistors DRT and T2-T6 can be silicon transistors (e.g., transistors having polysilicon channels formed using a low temperature process referred to as LTPS or low temperature polysilicon) formed from semiconductors such as silicon.

Since the oxide transistor has a relatively lower leakage current than the silicon transistor, when the transistor is implemented using the oxide transistor, it is possible to reduce a defect in image quality such as a flicker by preventing a current from leaking from the gate node of the driving transistor DRT.

Meanwhile, the remaining P-type transistors DRT and T2-T6 can be formed of low temperature polysilicon, while the first switching transistor T1 and the seventh switching transistor T7 can be N-type transistors.

The gate node of the first switching transistor T1 is supplied with the first scan signal SCAN1. The drain node of the first switching transistor T1 is connected to the gate node N1 of the driving transistor DRT. The source node of the first switching transistor T1 is connected to the source node N3 of the driving transistor DRT.

The first switching transistor T1 is turned on by the first scan signal SCAN1 to control the operation of the driving transistor DRT through the high potential driving voltage VDD stored in the storage capacitor Cst. The high potential driving voltage VDD can have a value of 2V to 3V and can be lower than the bias voltage VOBS, but embodiments are not limited thereto.

The first switching transistor T1 can be formed of an N-type MOS transistor to form an oxide transistor. Since the N-type MOS transistor uses electrons, not holes, as carriers, it has higher mobility than the P-type MOS transistor and can thus have a high switching speed.

The first switching transistor T1 can have a dual gate structure to suppress a high temperature leakage current. In this situation, the common node N2 of the first switching transistor T1 having the dual gate structure can be in a floating state according to the operating state of the first switching transistor T1. When the common node N2 of the first switching transistor T1 is in the floating state, the operation of the first switching transistor T1 can become unstable.

Accordingly, the seventh switching transistor T7 can be included to stably maintain the potential of the gate node N1 of the driving transistor DRT before the subpixel SP emits light.

The seventh switching transistor T7 is turned on or off according to the fifth scan signal SCAN5, and in the turned-on state, forms a current path between the common node N2 of the first switching transistor T1 and the gate node N1 of the driving transistor DRT. Accordingly, the gate node N1 of the driving transistor DRT and the common node N2 of the first switching transistor T1 are maintained at the same potential before the subpixel SP emits light. Accordingly, since the seventh switching transistor T7 maintains the gate node N1 of the driving transistor DRT at a stable potential, the seventh switching transistor T7 can be referred to as a stabilization transistor, and the fifth scan signal SCAN5 can be referred to as a stabilization scan signal.

In this situation, to stabilize the common node N2 of the first switching transistor T1, the stabilization capacitor Cs can be connected between the common node N2 of the first switching transistor T1 and the driving voltage VDD. However, the stabilization capacitor Cs can be omitted depending on the design of the subpixel circuit.

The gate node of the second switching transistor T2 is supplied with the second scan signal SCAN2. The source node of the second switching transistor T2 can receive the data voltage Vdata. The drain node of the second switching transistor T2 is connected to the drain node N5 of the driving transistor DRT.

The second switching transistor T2 is turned on by the second scan signal SCAN2 to supply the data voltage Vdata to the drain node N5 of the driving transistor DRT.

The gate node of the third switching transistor T3 is supplied with the light emission signal EM. The source node of the third switching transistor T3 is supplied with the high potential driving voltage VDD. The drain node of the third switching transistor T3 is connected to the drain node N5 of the driving transistor DRT.

The third switching transistor T3 is turned on by the light emission signal EM to supply the high potential driving voltage VDD to the drain node N5 of the driving transistor DRT.

The gate node of the fourth switching transistor T4 is supplied with the light emission signal EM. The drain node of the fourth switching transistor T4 is connected to the drain node N3 of the driving transistor DRT. The source node of the fourth switching transistor T4 is connected to the anode electrode N4 of the light emitting device ED. Also, the gates of the fourth switching transistor T4 and third switching transistor T3 can be tied together and both receive the light emission signal EM.

The fourth switching transistor T4 is turned on by the light emission signal EM to supply a driving current to the anode electrode N4 of the light emitting element ED.

The gate node of the fifth switching transistor T5 is supplied with the third scan signal SCAN3.

The source node of the fifth switching transistor T5 is supplied with a bias voltage VOBS. The bias voltage VOBS can have a value between 5.5 V and 7 V, and can be higher than the high potential driving voltage VDD, but embodiments are not limited thereto. The drain node of the fifth switching transistor T5 is connected to the drain node N3 of the transistor DRT.

The fifth switching transistor T5 is turned on by the third scan signal SCAN3 to supply the bias voltage VOBS to the drain node N3 of the driving transistor DRT.

The gate node of the sixth switching transistor T6 is supplied with the fourth scan signal SCAN4.

Here, the fourth scan signal SCAN4 can be a third scan signal SCAN3 supplied to the subpixel SP at another location. For example, when the third scan signal SCAN3 is applied to the nth gate line GL, the fourth scan signal SCAN4 can be the third scan signal SCAN3 applied to the n+1th gate line GL. In other words, the fourth scan signal SCAN4 can use the third scan signal SCAN3 in which the gate line GL is different according to the phase in which the display panel 110 is driven.

The source node of the sixth switching transistor T6 is supplied with the reset voltage VAR. The drain node of the sixth switching transistor T6 is connected to the anode electrode N4 of the light emitting device ED.

The sixth switching transistor T6 is turned on by the fourth scan signal SCAN4 to supply the reset voltage VAR to the anode electrode N4 of the light emitting element ED.

The gate node N1 of the driving transistor DRT is connected to the drain node of the first switching transistor T1. The source node N5 of the driving transistor DRT is connected to the drain node of the second switching transistor T2. The drain node N3 of the driving transistor DRT is connected to the source node of the first switching transistor T1.

The driving transistor DRT is turned on by a voltage difference between the source node and the drain node of the first switching transistor T1, and accordingly, the driving current Id is applied to the light emitting element ED.

A high potential driving voltage VDD is applied to one side of the storage capacitor Cst, and the other side of the storage capacitor Cst is connected to the gate node N1 of the driving transistor DRT. The storage capacitor Cst stores the voltage of the gate node N1 of the driving transistor DRT.

The anode electrode N4 of the light emitting element ED is connected to the source node of the fourth switching transistor T4 and the drain node of the sixth switching transistor T6. A low-potential base voltage VSS is applied to the cathode electrode N4 of the light emitting device ED.

The light emitting device ED emits light at a predetermined brightness according to the driving current Id from the driving transistor DRT.

In this situation, the reset voltage VAR is supplied to reset the anode electrode N4 of the light emitting device ED.

When the sixth switching transistor T6 supplies the reset voltage VAR to the anode electrode N4 of the light emitting element ED in a state in which the fourth switching transistor T4 is turned off by the light emission signal EM, the anode electrode N4 of the light emitting element ED can be reset.

The third scan signal SCAN3 for driving the driving transistor DRT or applying the bias voltage VOBS and the fourth scan signal SCAN4 for controlling the supply of the reset voltage VAR to the anode electrode N4 of the light emitting element ED can have different phases so that the driving operation of the driving transistor DRT and the operation of resetting the anode electrode N4 of the light emitting element ED can be performed separately.

In this situation, when the switching transistors T5 and T6 supplying the bias voltage VOBS and the reset voltage VAR are turned on, the fourth switching transistor T4 connecting the drain node N3 of the driving transistor DRT and the anode electrode N4 of the light emitting element ED can be turned off, thereby blocking the driving current Id of the driving transistor DRT from flowing to the anode electrode N4 of the light emitting element ED and preventing the influence of a voltage other than the reset voltage VAR.

As such, a subpixel circuit constituted of eight transistors DRT and T1-T7 and two capacitors Cst and Cs can be referred to as an 8T2C structure. In this situation, when the stabilization capacitor Cs is not formed, it will have an 8T1C structure.

Here, an 8T2C structure among subpixel circuits of various structures is illustrated as an example, and the structure and number of transistors and capacitors constituting the subpixel circuit can be varied. Meanwhile, the plurality of subpixels SP can have the same structure, or some of the plurality of subpixels SP can have a different structure.

Figure 7:
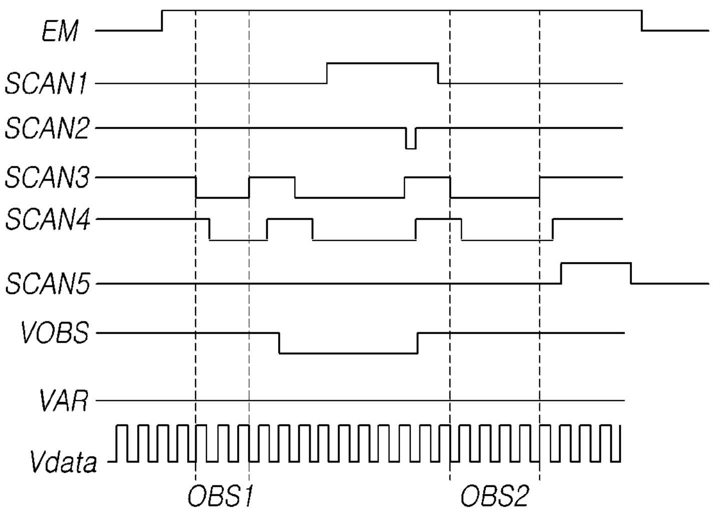
FIG. 7 is a signal waveform diagram illustrating an operation of another subpixel circuit in a display device according to embodiments of the disclosure.

FIG. 7 is a signal waveform diagram illustrating an operation of another subpixel circuit in a display device according to embodiments of the disclosure.

Referring to FIG. 7, in the display device 100 according to embodiments of the disclosure, an image can be displayed by a data voltage Vdata during an emission period. On the other hand, the bias voltage VOBS and the reset voltage VAR can be applied during the non-emission period, and a sampling process can be performed to compensate for the characteristic value (e.g., threshold voltage or mobility) of the driving transistor DRT.

For example, when the first switching transistor T1 is turned on by the first scan signal SCAN1 so that the gate node N1 and the drain node N3 of the driving transistor DRT are electrically connected to each other, the gate node N1 and the drain node N3 of the driving transistor DRT have substantially equal potentials.

In this situation, when the second switching transistor T2 is turned on by the second scan signal SCAN2 so that the data voltage Vdata is supplied, a current path is formed until the voltage difference between the gate node N1 and the drain node N3 of the driving transistor DRT reaches the threshold voltage of the driving transistor DRT. Accordingly, voltages of the gate node N1 and the drain node N3 of the driving transistor DRT are charged.

In other words, when the data voltage Vdata is supplied to the source node N5 of the driving transistor DRT, the voltages of the gate node N1 and the drain node N3 of the driving transistor DRT rise to the difference voltage between the data voltage Vdata and the threshold voltage. Accordingly, the threshold voltage of the driving transistor DRT can be compensated.

As described above, a process of compensating for the characteristic value of the driving transistor DRT by the sampling process can correspond to internal compensation.

Meanwhile, the bias voltage VOBS can be applied to alleviate the hysteresis effect that can occur in the driving transistor DRT and enhance the response characteristic.

For example, the driving transistor DRT can be in an on-bias state in which a peak white grayscale voltage is applied to the gate node N1 so that a large current flows between the drain node N3 and the source node N5 of the driving transistor DRT.

On the other hand, the driving transistor DRT can be in an off-bias state in which a peak black grayscale voltage is applied to the gate node N1 so that little current flows between the drain node N3 and the source node N5 of the driving transistor DRT.

The peak white grayscale voltage refers to a voltage applied to the gate node N1 of the driving transistor DRT for the light emitting element ED to emit light in the peak white grayscale (e.g., high brightness or white image), and the peak black grayscale voltage refers to a voltage applied to the gate node N1 of the driving transistor DRT for the light emitting element ED to emit light in the peak black grayscale (e.g., black or dark image). For example, when the grayscale value is expressed as an 8-bit digital value, the peak black grayscale can mean "0," which is a minimum value, and the peak white grayscale can mean "255," which is a maximum value.

In this situation, since the sweep curves are different in the on-bias state and the off-bias state in the P-type driving transistor DRT, a difference can occur in the current flowing between the drain node N3 and the source node N5 of the driving transistor DRT in the same grayscale.

In this situation, the phenomenon in which a difference is caused between the on-bias state and the off-bias state of the characteristic of the current flowing between the drain node N3 and source node N5 of the driving transistor DRT by the voltage difference between the gate node N1 and drain node N3 of the driving transistor DRT in the gray representation is referred to as hysteresis, which may cause ghosting or a blurry image defect.

Further, the difference in the driving current Id flowing between the drain node N3 and source node N5 of the driving transistor DRT may not stabilize the driving characteristics of the light emitting device ED, but rather can cause a difference in luminance.

In particular, when the display device 100 is driven at a high-speed driving frequency and then changed to a low-speed driving frequency, ghosting caused by hysteresis can be easily visible.

Therefore, in order to minimize ghosting due to hysteresis, one or more bias periods OBS1 and OBS2 in which the driving transistor DRT is set to the on-bias state can be performed before the emission period is started by the low-level light emission signal EM.

To this end, the driving transistor DRT can be set to the on-bias state by applying the bias voltage VOBS to the drain node N3 of the driving transistor DRT before the emission period starts.

For example, the bias voltage VOBS can be applied to the drain node N3 of the driving transistor DRT before the emission period starts.

Meanwhile, because a flicker may occur when the operation time at the low-speed driving frequency increases, the anode electrode N4 of the light emitting device ED can be reset to a predetermined level of reset voltage VAR.

In such a subpixel circuit, the common node N2 of the first switching transistor T1 having a dual gate structure can be in a floating state according to the operating state of the first switching transistor T1.

When the common node N2 of the first switching transistor T1 is in the floating state, a leakage current may flow from the drain node N3 of the driving transistor DRT or the stabilization capacitor Cs to the gate node N1 of the driving transistor DRT through the first switching transistor T1. The leakage current can cause image artifacts due to luminance deviation by undesirably changing the potential of the gate node N1 of the driving transistor DRT.

In order to reduce the leakage current, the seventh switching transistor T7 can be turned on by the fifth scan signal SCAN5 of the high level before the emission period is performed by the low-level emission signal EM. Accordingly, the gate node N1 of the driving transistor DRT maintains the same potential as the common node N2 of the first switching transistor T1. As a result, even if the common node N2 of the first switching transistor T1 is in the floating state and a leakage current flows, the gate node N1 of the driving transistor DRT can be stably maintained to reduce luminance deviation and enhance image quality.

Embodiments of the disclosure described above are briefly described below.

A display device 100 according to embodiments of the disclosure can comprise a display panel 110 including a plurality of subpixel circuits having a light emitting element ED, a driving transistor DRT for providing a driving current Id to the light emitting element ED using a driving voltage VDD, and a plurality of switching transistors for controlling an operation of the driving transistor DRT, a gate driving circuit 120 configured to supply a plurality of light emission signals EM and a plurality of scan signals SCAN to the display panel 110, a data driving circuit 130 configured to supply a plurality of data voltages Vdata to the display panel 110, and a timing controller configured to control the gate driving circuit 120 and the data driving circuit 130. The plurality of switching transistors can include a first switching transistor T1 controlled by a first scan signal SCAN1 and having a dual gate structure which connects a gate node N1 and a drain node N3 of the driving transistor DRT, and a stabilization transistor controlled by a stabilization scan signal and connecting the gate node N1 of the driving transistor DRT and a common node N2 of the first switching transistor T1.

The plurality of switching transistors can include a second switching transistor T2 controlled by a second scan signal SCAN2 and connecting a data line DL and a storage capacitor Cst, a third switching transistor T3 controlled by the light emission signal EM and connected between a drain node of the second switching transistor T2 and a reference voltage line RVL, a fourth switching transistor T4 controlled by the light emission signal EM and connected between the drain node N3 of the driving transistor DRT and an anode electrode N4 of the light emitting element ED, and a fifth switching transistor T5 controlled by the first scan signal SCAN1 and connected between the reference voltage line RVL and the anode electrode N4 of the light emitting element ED.

The display device 100 can further comprise a stabilization capacitor Cs connected between the common node N2 of the first switching transistor T1 and the driving voltage VDD.

The stabilization transistor can be turned on before an emission period to maintain the gate node N1 of the driving transistor DRT and the common node N2 of the first switching transistor T1 at the same potential.

The first switching transistor T1 and the stabilization transistor can be P-type transistors.

The plurality of switching transistors can include a second switching transistor T2 controlled by a second scan signal SCAN2 and connected between a data voltage Vdata and a source node of the driving transistor DRT, a third switching transistor T3 controlled by the light emission signal EM and connected between the driving voltage VDD and the source node of the driving transistor DRT, a fourth switching transistor T4 controlled by the light emission signal EM and connected between the drain node N3 of the driving transistor DRT and an anode electrode N4 of the light emitting element ED, a fifth switching transistor T5 controlled by a third scan signal SCAN2 and connected between a bias voltage VOBS and the drain node N3 of the driving transistor DRT, and a sixth switching transistor T6 controlled by a fourth scan signal SCAN2 and connected between a reset voltage VAR and an anode electrode N4 of the light emitting element ED.

The first switching transistor T1 and the stabilization transistor can be N-type transistors.

A display panel 110 according to embodiments of the disclosure can comprise a plurality of subpixels SP including a light emitting element ED, a driving transistor DRT for providing a driving current Id to the light emitting element ED using a driving voltage VDD, and a plurality of switching transistors for controlling an operation of the driving transistor DRT, a plurality of data lines DL for supplying a plurality of data voltages Vdata to the plurality of subpixels SP, and a plurality of gate lines GL for supplying a plurality of light emission signals EM and a plurality of scan signals SCAN to the plurality of subpixels SP. The plurality of switching transistors can include a first switching transistor T1 controlled by a first scan signal SCAN1 and having a dual gate structure which connects a gate node N1 and a drain node N3 of the driving transistor DRT, and a stabilization transistor controlled by a stabilization scan signal SCAN2 and connecting the gate node N1 of the driving transistor DRT and a common node N2 of the first switching transistor T1.

A subpixel circuit according to embodiments of the disclosure can comprise a light emitting element ED, a driving transistor DRT providing a driving current Id to the light emitting element ED using a driving voltage VDD, and a plurality of switching transistors controlling an operation of the driving transistor DRT. The plurality of switching transistors can include a first switching transistor T1 controlled by a first scan signal SCAN1 and having a dual gate structure which connects a gate node N1 and a drain node N3 of the driving transistor DRT, and a stabilization transistor controlled by a stabilization scan signal and connecting the gate node N1 of the driving transistor DRT and a common node N2 of the first switching transistor T1.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A display device, comprising:

a display panel including at least one subpixel circuit having a light emitting element, a driving transistor for providing a driving current to the light emitting element based on a driving voltage, and a plurality of switching transistors for controlling an operation of the driving transistor;

a gate driving circuit configured to supply a plurality of light emission signals and a plurality of scan signals to the display panel;

a data driving circuit configured to supply a plurality of data voltages to the display panel; and a timing controller configured to control the gate driving circuit and the data driving circuit, wherein the plurality of switching transistors in the at least one subpixel circuit include:

a first switching transistor having a dual gate structure, the first switching transistor being configured to connect a gate node of the driving transistor with a drain node of the driving transistor, in response to a first scan signal; and a stabilization transistor configured to connect the gate node of the driving transistor with a common node of the first switching transistor, in response to a stabilization scan signal.

2. The display device of claim 1, wherein the first switching transistor includes two transistors connected in series, and wherein the common node is between the stabilization transistor and the two transistors.

3. The display device of claim 1, wherein the plurality of switching transistors in the at least one subpixel circuit further include:

a second switching transistor configured to connect a data line with a storage capacitor, in response to a second scan signal;

a third switching transistor configured to connect a drain node of the second switching transistor with a reference voltage line, in response to a light emission signal;

a fourth switching transistor configured to connect the drain node of the driving transistor with an anode electrode of the light emitting element, in response to the light emission signal; and a fifth switching transistor configured to connect the reference voltage line with the anode electrode of the light emitting element, in response to the first scan signal.

4. The display device of claim 3, wherein the first switching transistor and the stabilization transistor are P-type transistors.

5. The display device of claim 1, wherein the least one subpixel circuit further includes:

a stabilization capacitor connected between the common node of the first switching transistor and the driving voltage.

6. The display device of claim 1, wherein the stabilization transistor is configured to be turned on before an emission period of the light emitting element to maintain the gate node of the driving transistor and the common node of the first switching transistor at a same voltage level.

7. The display device of claim 1, wherein the plurality of switching transistors in the at least one subpixel circuit further include:

a second switching transistor configured to connect a data voltage with a source node of the driving transistor, in response to a second scan signal;

a third switching transistor configured to connect the driving voltage with the source node of the driving transistor, in response to a light emission signal;

a fourth switching transistor configured to connect the drain node of the driving transistor with an anode electrode of the light emitting element, in response to the light emission signal;

a fifth switching transistor configured to connect a bias voltage with the drain node of the driving transistor, in response to a third scan signal; and a sixth switching transistor configured to connect a reset voltage with the anode electrode of the light emitting element, in response to a fourth scan signal.

8. The display device of claim 7, wherein the first switching transistor and the stabilization transistor are N-type transistors.

9. A display panel, comprising:

a plurality of subpixels including a light emitting element, a driving transistor for providing a driving current to the light emitting element based on a driving voltage, and a plurality of switching transistors for controlling an operation of the driving transistor;

a plurality of data lines for supplying a plurality of data voltages to the plurality of subpixels; and a plurality of gate lines for supplying a plurality of light emission signals and a plurality of scan signals to the plurality of subpixels, wherein the plurality of switching transistors include:

a first switching transistor having a dual gate structure, the first switching transistor being configured to connect a gate node of the driving transistor with a drain node of the driving transistor, in response to a first scan signal; and a stabilization transistor configured to connect the gate node of the driving transistor with a common node of the first switching transistor, in response to a stabilization scan signal.

10. The display panel of claim 9, wherein the plurality of switching transistors include:

a second switching transistor configured to connect a data line with a storage capacitor, in response to a second scan signal;

a third switching transistor configured to connect a drain node of the second switching transistor with a reference voltage line, in response to a light emission signal;

a fourth switching transistor configured to connect the drain node of the driving transistor with an anode electrode of the light emitting element, in response to the light emission signal; and a fifth switching transistor configured to connect the reference voltage line with the anode electrode of the light emitting element, in response to the first scan signal.

11. The display panel of claim 9, wherein the first switching transistor and the stabilization transistor are P-type transistors.

12. The display panel of claim 9, further comprising a stabilization capacitor connected between a common node of the first switching transistor and the driving voltage.

13. The display panel of claim 9, wherein the stabilization transistor is configured to be turned on before an emission period of the light emitting element to maintain the gate node of the driving transistor and the common node of the first switching transistor at a same voltage level.

14. The display panel of claim 9, wherein the plurality of switching transistors include:

a second switching transistor configured to connect a data line with a source node of the driving transistor, in response to a second scan signal;

a third switching transistor configured to connect the driving voltage with the source node of the driving transistor, in response to the light emission signal;

a fourth switching transistor configured to connect the drain node of the driving transistor with an anode electrode of the light emitting element, in response to the light emission signal;

a fifth switching transistor configured to connect a bias voltage with the drain node of the driving transistor, in response to a third scan signal; and a sixth switching transistor configured to connect a reset voltage with an anode electrode of the light emitting element, in response to a fourth scan signal.

15. The display panel of claim 14, wherein the first switching transistor and the stabilization transistor are N-type transistors.

16. A subpixel circuit, comprising:

a light emitting element;

a driving transistor for providing a driving current to the light emitting element based on a driving voltage; and a plurality of switching transistors for controlling an operation of the driving transistor, wherein the plurality of switching transistors include:

a first switching transistor having a dual gate structure, the first switching transistor being connected between a gate node of the driving transistor and a drain node of the driving transistor, and configured to receive a first scan signal; and a stabilization transistor connected between the gate node of the driving transistor and a common node of the first switching transistor, the stabilization transistor being configured to receive a stabilization scan signal.

17. The subpixel circuit of claim 16, wherein the plurality of switching transistors include:

a second switching transistor connected between a data line and a storage capacitor, and configured to receive a second scan signal;

a third switching transistor connected between a drain node of the second switching transistor and a reference voltage line, and configured to receive a light emission signal;

a fourth switching transistor connected between the drain node of the driving transistor and an anode electrode of the light emitting element, and configured to receive the light emission signal; and a fifth switching transistor connected between the reference voltage line and the anode electrode of the light emitting element, and configured to receive the first scan signal.

18. The subpixel circuit of claim 16, further comprising a stabilization capacitor connected between the common node of the first switching transistor and the driving voltage.

19. The subpixel circuit of claim 16, wherein the stabilization transistor is configured to be turned on before an emission period of the light emitting element to maintain the gate node of the driving transistor and the common node of the first switching transistor at a same voltage level.

20. The subpixel circuit of claim 16, wherein the plurality of switching transistors include:

a second switching transistor connected between a data voltage and a source node of the driving transistor, and configured to receive a second scan signal;

a third switching transistor connected between the driving voltage and the source node of the driving transistor, and configured to receive the light emission signal;

a fourth switching transistor connected between the drain node of the driving transistor and an anode electrode of the light emitting element, and configured to receive the light emission signal;

a fifth switching transistor connected between a bias voltage and the drain node of the driving transistor, and configured to receive a third scan signal; and a sixth switching transistor connected between a reset voltage and an anode electrode of the light emitting element, and configured to receive a fourth scan signal.

* * * * *